March 26, 1963  C. W. KIKER, JR  3,082,545
TEACHING AND TESTING MACHINE
Filed July 20, 1961
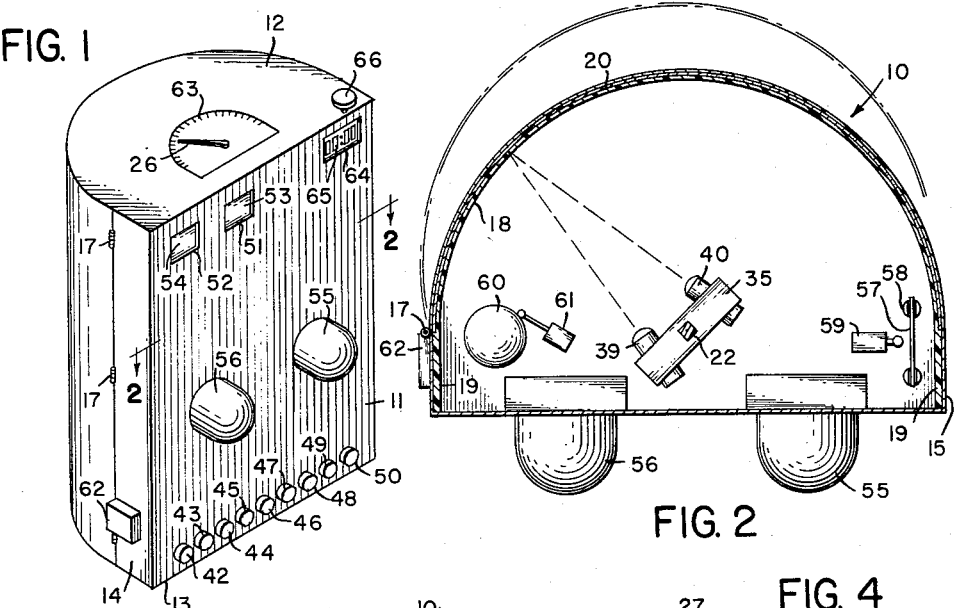
FIG. 1
FIG. 2
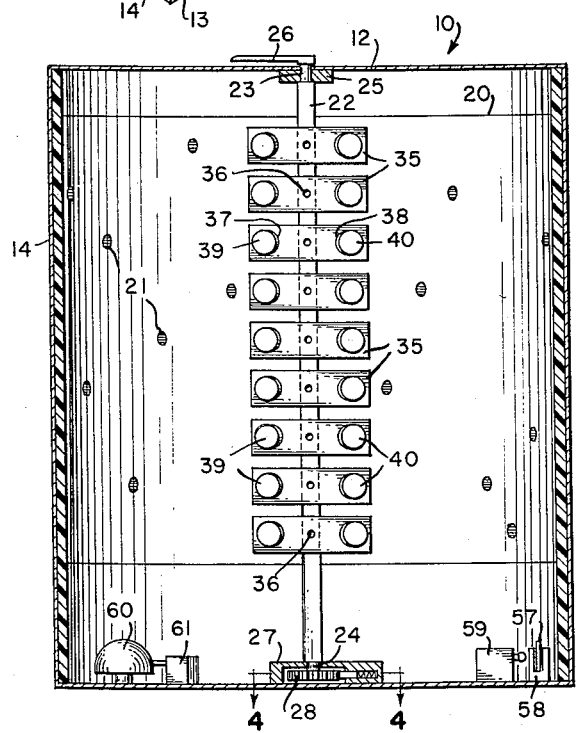
FIG. 3
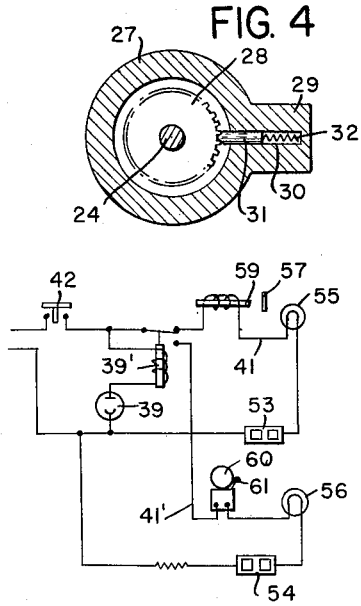
FIG. 4
FIG. 5
INVENTOR
C. W. KIKER, JR
BY
ATTORNEY

United States Patent Office 3,082,545
Patented Mar. 26, 1963

3,082,545
TEACHING AND TESTING MACHINE
Charles W. Kiker, Jr., P.O. Box 306, Blue Ridge, Ga.
Filed July 20, 1961, Ser. No. 125,397
3 Claims. (Cl. 35—9)

This invention relates to the imparting or transferring of information and to apparatus or equipment employed in such operations and for measuring or determining nature and accuracy of the results obtained.

The invention relates particularly to a machine by means of the operation of which correct answers to specific questions can be obtained and an elevation of the answers likewise can be determined and indicated.

Teaching has been undertaken to the extent that certain principles have been clearly recognized and established for motivation. These include increase in interest by the presentation of awards, the omission of punishment and the utilization of certain psychological factors. The ultimate in teaching however, has not been attained and the present invention is the result.

It is an object of the invention to provide a teaching and testing machine designed to take advantage of clearly established psychological principles including reward which reinforces the desire, the avoidance of punishment which profits learning, and the psychological feedback which facilitates learning the last act in the behavioral sequence most likely to be remembered.

Another object of the invention is to provide a machine designed to contain a roll of sheet material such as paper with dots or other indications at different locations and with an electric circuit including an electric eye set at the correct answer, a solenoid counter to record the answer, a given green light and a musical accompaniment to indicate that the correct answer push button is contacted, and to provide an electrical circuit including a solenoid counter to record the answer, a circuit with a red light, a startling sound and perhaps a device for imparting an electrical shock to indicate that a push button other than the correct answer is contacted.

It is an object also of the machine to provide a timer.

A further object of the invention is to provide a simple and inexpensive machine or piece of equipment for determining the correct answers thus imparting knowledge and simultaneously for indicating the correctness or incorrectness of the answers given.

Other objects and advantages of the invention will be apparent from the following description taken in conjunction with the accompanying drawings, wherein:

FIG. 1 is a perspective illustrating one application of the invention;

FIG. 2, a horizontal section on the line 2—2 of FIG. 1;

FIG. 3, a vertical section on the line 3—3 of FIG. 1;

FIG. 4, a horizontal, detailed section on the line 4—4 of FIG. 3; and

FIG. 5, a wiring diagram.

Briefly stated, the invention is a machine or piece of apparatus or equipment for use in teaching and determining the results and it includes a housing in which is inserted sheet with indications such as dark areas thereon in predetermined selected locations. Within the housing is a shaft with a pointer on its extremity visible exteriorly of the housing. A plurality of photoelectric cell and light source units are mounted on the shaft and are pre-focused at a point on the sheet with the indications. The photoelectric cell and light source units are connected into a pair of circuits, each of such units being operable by push button, to indicate the correctness or falsity of an answer given by a contestant or one being examined. The indicator is moved to a selected position, the instructor asks the question and when the operator presses a control switch, which if it is correct, the correct answer circuit will be energized and if it is incorrect, the incorrect answer circuit will be energized. When the answer is correct, it will be recorded on a solenoid counter, a green light will flash and a musical note will be sounded and when the answer is incorrect, it will be recorded on a second solenoid counter, a red light will flash, a bell will ring and if desired a mild shock will be imparted to the operator.

With continued reference to the drawing, the teaching and testing apparatus of the present invention comprises a housing 10 of generally cylindrical form having a generally flat front 11, top 12 and a bottom 13. The front 11 has a pair of side flanges 14 and 15 and an arcuate back 16 connected to the flange 14 by hinges 17. The front is connected to the flange 15 by conventional latch means not shown. An arcuate liner 18 of transparent material such as clear plastic, glass or the like is mounted inside the semicylindrical housing in proximity to the back 16 and the flanges 14 and 15. Such liner has enlarged end portions 19 and the major portion of the liner is spaced from the back 16 a distance sufficient to insert a strip of paper 20 or the like between the liner 18 and the back 16. The paper 20 has a plurality of darkened indicator areas 21 located in predetermined selected positions for a purpose which will be described later.

The housing has a substantially vertical shaft 22 which is generally square in cross section throughout the greater portion of its length and has reduced portions 23 and 24 at its upper and lower ends respectively which are generally cylindrical in cross section. The reduced portion 23 is journaled in a bearing 25 fixed to the top 12 and projects through the top to receive a pointer or indicator 26 on the end thereof. The reduced portion 24 is journaled in a boss 27 and receives a gear 28 on the lower free end of the shaft. The boss 27 is provided with an enlargement 29 on one side thereof and such enlargement has an opening 30 in which is slidably received a detent pin 31 and a spring 32 which normally urges the pin 31 toward the center of the boss 27 and into engagement with the gear 28.

The shaft 22 is adapted to receive a plurality of holders 35 mounted on such shaft by set screws 36 and each of such holders has openings 37 and 38 in opposite ends thereof. A photoelectric cell unit 39 is mounted in the opening 37 and a source of light 40 is mounted in the opening 38 of each of the holders 35. The photoelectric cell 39 and the source of light 40 of each holder are pre-focused so that they are directed at a point where the paper 20 is in contact with the liner 18.

A series of control switches 42–50 are mounted on the front 11 and each switch controls one of the photoelectric cell and source of light units so that when a switch is pressed the source of light is energized and a beam is projected onto the paper. If the beam strikes one of the darkened areas 21, the light will be absorbed so that the photoelectric cell will not be energized and a circuit 41 indicating a correct answer will be energized. If the beam strikes the white paper, the light rays will be reflected onto the photoelectric cell and the resistances in such cell will be altered to energize a solenoid 39' to cause electrical energy to be diverted into a circuit 41' indicating a wrong answer.

The front 11 of the device is provided with windows 51 and 52 through which conventional counters 53 and 54 are visible. Counters 53 and 54 are connected in the circuits controlled by the photoelectric cell and light source units so that when a correct answer is indicated, it will be recorded on the counter 53, and when an incorrect answer is indicated it will be recorded on the counter 54. A pair of lights 55 and 56 are connected into the circuits with the light 55 preferably being colored green to indicate a correct answer and the light 56 being colored red to indicate an incorrect answer.

A musical bar 57 is mounted on a pair of bifurcated posts 58 on the bottom 13 on the interior of the casting and a solenoid 59 is located in proximity to the musical bar so that when the correct answer circuit is energized, the solenoid will strike the bar to produce a pleasant sound. A bell 60 having a clapper 61 is mounted on the bottom 13 and the clapper is connected in the circuit for an incorrect answer so that when an incorrect answer is recorded, the bell will sound a harsh tone.

If desired a plate 62 may be mounted on the exterior of the flange 14 and connected to the incorrect answer circuit so that the operator of the device can place his hand against the plate 62 and when a wrong answer is indicated, a mild shock will be imparted to the operator's hand.

Th pointer 26 is located on top of the device and such top may be provided with indicia 63 for indicating the number of the question being asked.

The front 11 may be provided with an opening 64 through which a timer 65 is visible and such timer records the total elapsed time that the test has taken. The timer is provided with a reset button 66 which may be used to start and stop the operation of the timer.

In the operation of the device the back 16 is pivoted open and a piece of paper 20 having darkened areas 21 in predetermined selected positions is inserted against the liner 18. The darkened areas are located in a position corresponding to the photoelectric cell and light source unit which indicates the correct answer to a predetermined question. The indicator 26 is pointed at question #1 and when the instructor asks the question which preferably has many answers only one of which is correct, the operator of the device presses one of the control switches 42-50. If the control switch which the operator presses is the correct switch, the correct answer circuit will be energized and the counter 53 will register a correct answer the green light 55 will light and the musical bar 57 will sound a pleasing note. If the answer is incorrect, such incorrect answer will be recorded on the counter 54, the red light 56 will light, the bell 60 will sound a harsh note and the plate 62 will impart a mild shock to the operator.

It will be obvious to one skilled in the art that various changes may be made in the invention without departing from the spirit and scope thereof and therefore the invention is not limited by that which is illustrated in the drawing and described in the specification, but only as indicated in the accompanying claims.

What is claimed is:

1. Teaching and testing apparatus including a housing having an answer sheet holder thereon, a transparent liner in said housing in fixed space relation to the inside thereof, sheet material having indicator areas in pre-determined selected positions adapted to be inserted in said holder in said housing, a plurality of photoelectric cell units mounted in spaced relation on said housing, a control for each of said photoelectric cell units mounted on said housing to be manually actuated by the person being tested, a first circuit including said photoelectric cell units, and a second circuit on said housing, said first circuit being for right answers and including right answer indication means therewith, and the second circuit being for wrong answers and including wrong answer indication means, each of said photoelectric cell units being prefocused on said answer sheet and each of said source of lights being prefocused on said answer sheet whereby when a light beam from the source of light strikes any one of the indicator areas on said sheet the photoelectric cell will not be energized and the correct answer circuit will be completed, and when a light beam strikes the sheet other than on the indicator areas the light will be reflected onto the photoelectric cell and the incorrect answer circuit will be energized.

2. Teaching and testing apparatus including an elongated substantially semi-cylindrical housing with a curved wall and a flat wall, a transparent liner in said housing in fixed spaced relation to said curved wall, sheet material having indicator areas in predetermined selected positions adapted to be inserted between said transparent liner and said curved wall, a shaft mounted lengthwise in said semi-cylindrical housing and extending through one of the ends thereof, an indicator mounted on said shaft exteriorly of said housing, a series of holders mounted in spaced relation on said shaft, a photoelectric cell unit and a source of light carried by each of said holders, a control switch for each of said photoelectric cell units mounted on the flat wall of said housing, a pair of circuits under the influence of said photoelectric cell units, one being for right answers and including a solenoid counter a green light and musical tone, and the other comprising an incorrect answer circuit and including a solenoid counter a red light and a bell, each of said photoelectric cell units and associated source of light being prefocused on said sheet material whereby when a light beam from the source of light strikes one of the indicator areas on said sheet material the photoelectric cell will not be energized and the correct answer circuit will be completed, and when a light beam strikes sheet material other than on the indicator areas the light will be reflected onto the photoelectric cell unit and the correct answer circuit will be energized.

3. Apparatus of the character indicated for teaching and determining the amount of knowledge comprising a housing, a shaft mounted generally lengthwise in said housing, an element for rotating and for indicating the position of rotation of said shaft, a series of holder units operatively associated with said shaft, two normally open electrical circuits operatively associated with each of said holder units, circuit completing means, one of said circuits comprising a solenoid counter a green light and a musical tone and the other circuit comprising a solenoid counter a red light and a bell, said housing having a curved wall, sheet material having indicator areas in predetermined selected positions mounted in association with said curved wall, photoelectric cell units and associated sources of light prefocused on said sheet material for completing one of said circuits when a beam of light from the light source strikes one of the indicator areas the first circuit will be energized to indicate a correct answer, and when the beam of light does not strike one of the darkened areas the second circuit will be energized to indicate an incorrect answer.

References Cited in the file of this patent

UNITED STATES PATENTS

| Re: 23,030 | Holt | Aug. 24, 1948 |
| 2,401,434 | Mills | June 4, 1946 |
| 2,720,038 | Clark | Oct. 11, 1955 |
| 2,826,828 | Hamilton | Mar. 18, 1958 |
| 2,922,232 | Twyford | Jan. 26, 1960 |